Jan. 7, 1969     H. B. KADAH     3,420,942
SOLID STATE PACK

Filed April 25, 1967     Sheet 1 of 3

INVENTOR.
HASSAN B. KADAH.
BY
ATTORNEY

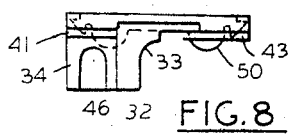
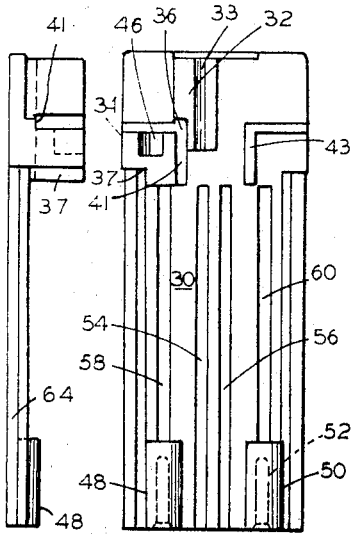
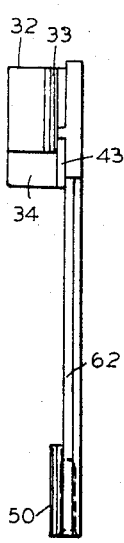
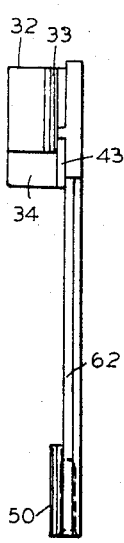
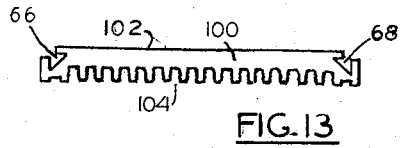
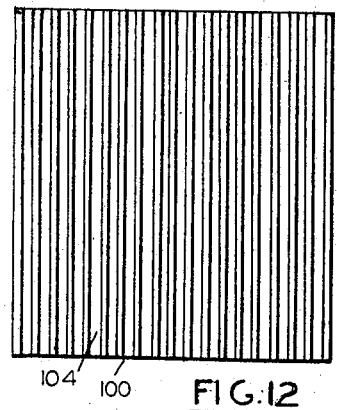
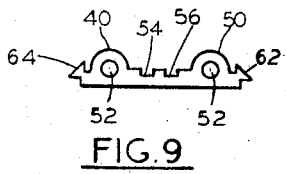

Jan. 7, 1969   H. B. KADAH   3,420,942
SOLID STATE PACK

Filed April 25, 1967   Sheet 3 of 3

INVENTOR.
HASSAN B. KADAH
BY
*F. P. Kenpen*
ATTORNEY

United States Patent Office 3,420,942
Patented Jan. 7, 1969

3,420,942
SOLID STATE PACK
Hassan B. Kadah, P.O. Box 566,
Syracuse, N.Y. 13201
Filed Apr. 25, 1967, Ser. No. 633,484
U.S. Cl. 174—15                                              8 Claims
Int. Cl. H01b 7/34

ABSTRACT OF THE DISCLOSURE

A compact housing unit for solid state circuit boards having side members with external radiating fins, connected to plastic end members by sliding dove tail joints the end members having grooves to receive circuit boards, the end members being alike and at one end having provision for a terminal, and adapted to interfit with an intermediate or several intermediate complementary terminal sections, and at the other end having a mounting plate secured by screws, to the end members, the mounting plate when in position locking all parts in assembled relation.

---

This invention relates to housings for solid state circuitry, and more particularly to a housing that can be assembled with varying housing components, and having provision for heat dissipation.

In solid state circuitry, transistor switching devices, although often controlling relatively small currents and also relatively heavy currents, do not have the benefit of open, and closed metallic contacts having substantially infinite or zero resistance. On the contrary, transistor devices when in open circuit pass leakance currents, and thus exhibit merely high resistance, and when saturation current flows, the transistor exhibits low resistance. Any resistance through which there is current flow, results in the generation of heat, and it is therefore desirable to dissipate such heat, to maintain the temperatures of the transistors within a desired range, it being understood that transistor characteristics vary with temperature, and high temperatures may have a destructive effect.

The present invention is directed to a compact housing unit adapted to accommodate one or more solid state circuit boards, and having provision for heat dissipation, terminal connections, and indicators for indicating the condition of transistor switches disposed within the housing, or pack. The invention further is directed to an assembly of elements and sections which interfit in such a way as to permit the assembly of a pack that is receptive of various solid state circuit components.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 7 is a plan view of an end member;

FIGURE 8 is an upper end view of FIGURE 7;

FIGURE 9 is a lower end view of FIGURE 7;

FIGURE 10 is a view of the right hand edge of FIGURE 7;

FIGURE 11 is a view of the left hand edge of FIGURE 7;

FIGURE 12 is a plan view of the heat sink panel;

FIGURE 13 is an end view of FIGURE 12;

Figure 1:
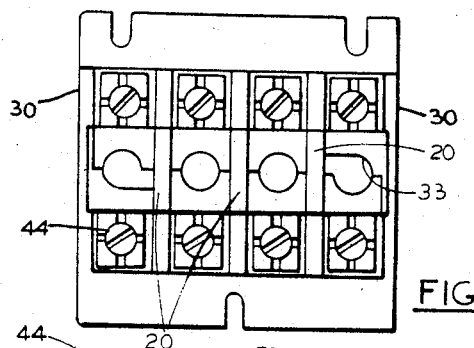
FIGURE 1 is a top plan view of one form of assembly.
Figure 4:
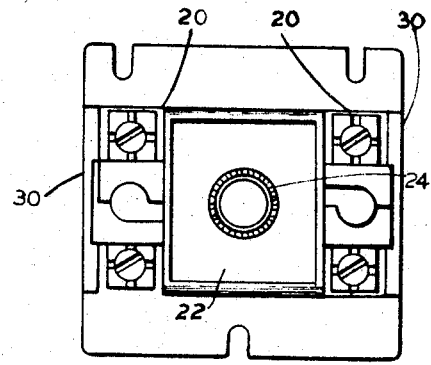
FIGURE 4 is a top plan view of a modified form of assembly.
Figures 2, 3:
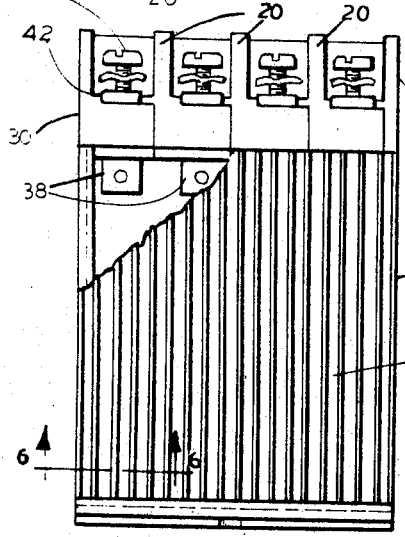
FIGURE 2 is a side elevation of FIGURE 1, with parts broken away.
FIGURE 3 is an end elevation of FIGURE 1.
Figure 5:
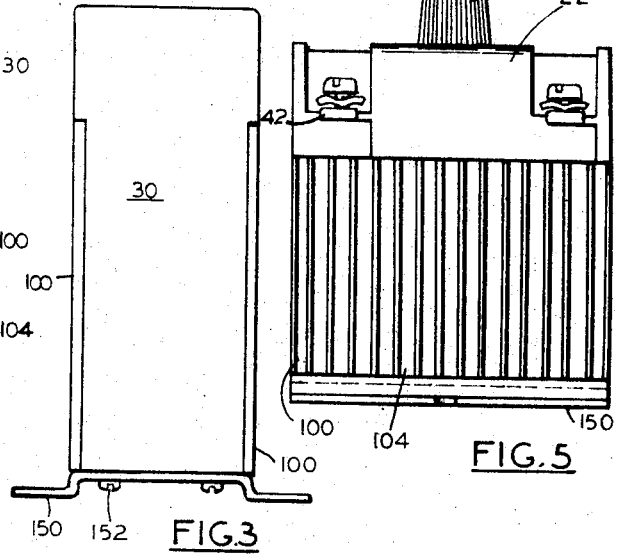
FIGURE 5 is a fragmentary side elevation of FIGURE 4.
Figure 6:
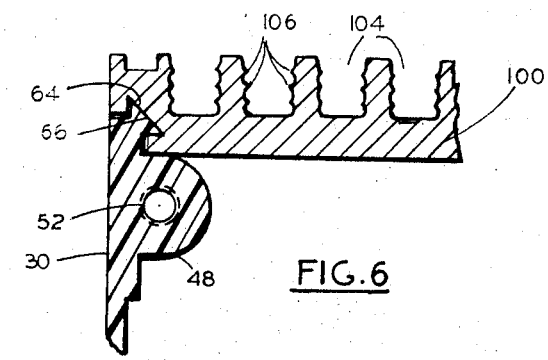
FIGURE 6 is an enlarged fragmentary sectional view taken on the line 6—6 of FIGURE 2.
Figure 14:
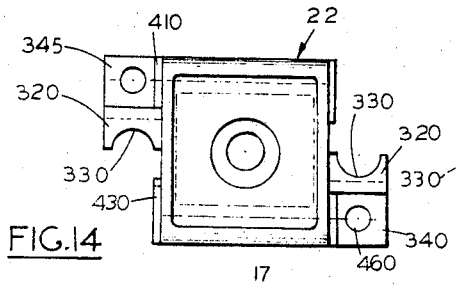
FIGURE 14 is a plan view of an adjustment section.
Figure 16:
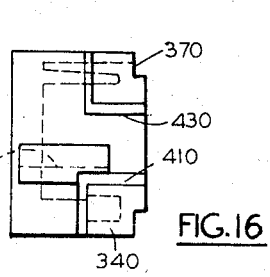
FIGURE 16 is an end view of FIGURE 14.
Figure 15:
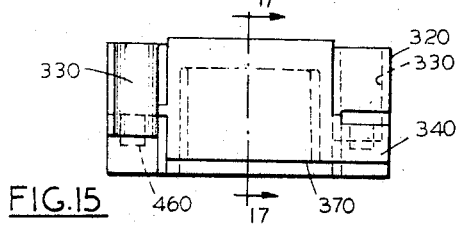
FIGURE 15 is a side view of FIGURE 14.
Figure 17:
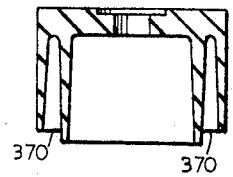
FIGURE 17 is a sectional view taken on the line 17—17 of FIGURE 15.

The pack may comprise various combinations of parts, including two end members, and various intermediate sections. In FIGURES 1-3, there is shown a pack having two end members 30, and three identical intermediate sections 20. In FIGURES 4 and 5, the three intermediate sections are replaced by a single center adjustment section 22. Such section may have a potentiometer mounted in the center aperture, with a control knob 24.

Figures 20, 21:
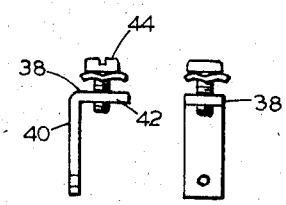
FIGURES 20 and 21 are side and end views of a terminal.

Each end member 30, FIGURES 7-11, comprises a lengthwise extending rib 32 at one end disposed to one side of the center, and spaced from a substantially square projection 34 of like height adjacent thereto, the rib 32 and projection 34 providing an L shaped recess 36 to receive an L shaped terminal member 38 of brass or the like (see FIGURES 20 and 21), having a lug portion 40 extending into the box, and a lateral portion 42 having a threaded binding screw 44, the shank of which projects into the recess 46. The raised L shaped portions 41 and 43, engage the side edges of the terminal members and center the members between the adjacent sections. The rib 32 has a quarter round portion 33 the axis of which lies on the center line of the member. As the inner end are bosses 48 and 50, having apertures 52 to receive self tapping screws. Extending lengthwise of the member are grooves 54 and 56, and 58 and 60, which are adapted to engage the side edges of rectangular circuit boards which may be assembled within the box. Along the side edges are dovetail sectioned ribs 62 and 64, adapted to interfit with corresponding grooves 66 and 68 along the side edges of the heat sink, or heat dissipation heat conductor side members 100.

Figure 18:
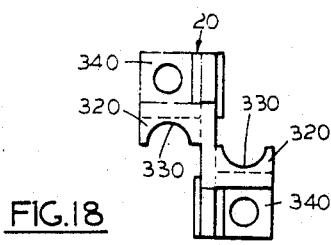
FIGURE 18 is a plan view of an intermediate section.
Figure 19:
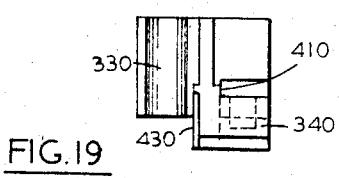
FIGURE 19 is a side view of FIGURE 18.

Disposed between two end members 30, may be a plurality of intermedite terminal sections 20, (see FIGURES 18 and 19) or a square terminal section, such as a control or adjustment section 22 of thrice the width of a terminal section (see FIGURES 14–17.) In either case, the interfitting complementary end configurations of the terminal sections are identical and complementary to and interfit with the end members, as well as the adjacent terminal or control section, as the case may be. Each section comprises a rib 320, on each side, with an opposite facing semi-circular recesses 330 adapted to cooperate with the recess of an adjacent section, or the quarter round portion 33 of the end members to provide cylindrical recesses for receiving a transistor switch on or off indicator light. As can be seen the rib 320 cooperates with a relatively square block or projection 340 which provides a right angle recess to receive an L shaped terminal member 38, the block having a circular well 460 to receive the shank of a binding screw 44 threaded in the terminal member 38. Raised L shaped shoulders 410 and 430 are adapted to cooperate with the like shoulders of adjacent sections and shoulders 41 and 43 to center the terminals in their respective recesses.

The projection 34, and the blocks 340 of the intermediate sections are recessed as at 37 and 370 to receive the outer ends of the side heat conducting panels 100 (see FIGURES 12 and 13.) Such heat conducting panels may be of aluminum, and have an inside face 102 anodized and blackened for heat absorption from the various elements mounted on the circuit boards within the box. The exterior is grooved as at 104 to provide heat radiating fins, and the side faces of the grooves are additionally ribbed as at 106 to provide an extended radiation or heat transfer surface for dissipating heat to the surrounding atmosphere. The exterior is preferably anodized and blackened for efficient radiation. Along the opposite edges of the panels 100 are dovetailed recesses 66 and 68, adapted to cooperate with the dovetailed sectioned ribs 62 and 64 of the end members 30. In practice the panels 100 will be of a height to correspond with the length of the end panels 30, commencing at the recess 37, and the width of the heat panels 100 will be such as to hold two end panels, and as many terminal or other sections therebetween as desired.

When two end members, and as many terminal or other sections are assembled, and the requisite circuit boards installed and connections made, the heat panels are slid in place, and a mounting plate 150 of suitable size having apertures aligned with the apertures 52 is applied to the assembly, so that upon securing the plate 150 in position by self tapping screws 152, the heat panels and end members lock the assembly together as a unit.

The heat panels may be made of any good heat conductor such as aluminum or alloys thereof, and may have circuit boards or other electrical elements bonded to the inside surface. In any event the panels are preferably anodized and coated with a dull black efficient heat absorption, and heat radiating material. The remaining members, other than the terminals and mounting member 150, are readily molded from suitable plastic. The mounting member may contact with the ends of the heat panels, and assist in transferring heat by conduction to the structure to which the mounting member is secured, and the terminals 38 may also conduct heat from within the pack.

While several embodiments with variations of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A housing for solid state circuitry comprising a pair of end members having at least one intermediate section at one end, said end members and intermediate section having complementary ribs and projections spaced therefrom defining terminal recesses, and heat conductor side members extending from said section to the other end, and secured to the side edges of said end members, and a mounting plate secured to the other end of said end members and overlying the ends of said heat conductor side members.

2. A housing for solid state circuitry according to claim 1 wherein the heat conductor side members, and end members are connected by lengthwise extending dovetailed sectioned tongue and grooves.

3. A housing for solid state circuitry according to claim 1 wherein the intermediate section and adjacent member have opposed cylindrical recess defining a substantially cylindrical aperture to receive an indicator light.

4. A housing for solid state circuitry according to claim 1, wherein the rib and projection define an L shaped slot for reception of the terminal member.

5. A housing for solid state circuitry according to claim 1, wherein the heat conductor side members have a plurality of exterior deep grooves defining heat radiating fins.

6. A housing in accordance with claim 5 wherein the side members are anodized aluminum, and coated with dull black material to provide efficient heat absorption and radiation.

7. A housing in accordance with claim 1 wherein the end members have several lengthwise grooves in their inside surfaces to receive rectangular shaped circuit boards.

8. A housing according to claim 1 wherein each section has a rib immediately to one side of center, on its opposite sides, and each said rib has on one side a semicylindrical recess, the center line of which is on the center line of the section, and in which each section has a substantially square projection of the same height as the ribs along an edge spaced from the inner end of the other side of each of said ribs, and each of said ribs having a recess facing the adjacent projection, and providing with said projection a substantial portion of an L shaped slot to receive an L shaped terminal.

References Cited

UNITED STATES PATENTS

| 2,888,228 | 5/1959  | Jarvis _____ 248—316 |
| 3,206,646 | 9/1965  | Relation et al. _____ 317—100 |
| 3,355,540 | 11/1967 | Newell _____ 174—15 |
| 3,342,255 | 9/1967  | Risk et al. _____ 165—80 |

LEWIS H. MYERS, *Primary Examiner.*

A. T. GRIMLEY, *Assistant Examiner.*

U.S. Cl. X.R.

165—80; 317—100